(12) United States Patent
Marshall et al.

(10) Patent No.: US 6,665,042 B1
(45) Date of Patent: Dec. 16, 2003

(54) ELECTRICALLY SWITCHABLE POLYMER LIQUID CRYSTAL AND POLYMER BIREFRINGENT FLAKE IN FLUID HOST SYSTEMS AND OPTICAL DEVICES UTILIZING SAME

(75) Inventors: Kenneth L. Marshall, Henrietta, NY (US); Tanya Z. Kosc, Rochester, NY (US); Stephen D. Jacobs, Pittsford, NY (US); Sadeg M. Faris, Pleasantville, NY (US); Le Li, Yorktown Heights, NY (US)

(73) Assignee: The University of Rochester, Rochester, NY (US)

( * ) Notice: Subject to any disclaimer, the term of this patent is extended or adjusted under 35 U.S.C. 154(b) by 0 days.

(21) Appl. No.: 09/571,805

(22) Filed: May 16, 2000

(51) Int. Cl.[7] .............................................. C09K 19/52
(52) U.S. Cl. ........................ 349/166; 349/86; 359/253; 359/259
(58) Field of Search .................... 349/86, 166, 163, 349/167, 175, 176, 115, 194; 359/253, 296; 428/363, 402; 106/31.27, 493

(56) References Cited

U.S. PATENT DOCUMENTS

| | | | |
|---|---|---|---|
| 3,406,363 A | 10/1968 | Tate ........................... 335/302 |
| 3,668,106 A | 6/1972 | Ota ............................. 204/299 |
| 3,841,732 A | * 10/1974 | Marks ......................... 359/296 |
| 3,967,265 A | 6/1976 | Jacob ........................ 340/324 R |
| 4,076,387 A | 2/1978 | Haas et al. .................. 350/362 |
| 4,126,528 A | 11/1978 | Chiang |
| 4,126,854 A | 11/1978 | Sheridon ..................... 340/373 |
| 4,143,103 A | 3/1979 | Sheridon ........................ 264/4 |
| 4,270,841 A | 6/1981 | Saxe |
| 4,285,801 A | 8/1981 | Chiang |
| 4,298,448 A | 11/1981 | MIller et al. |
| 4,305,807 A | 12/1981 | Somlyody ............... 204/299 R |
| 4,311,361 A | 1/1982 | Somlyody |
| 4,657,349 A | 4/1987 | Labes et al. |
| 4,680,103 A | 7/1987 | Beilin Solomon I. et al. |
| 4,688,900 A | 8/1987 | Doane et al. ........... 350/347 V |
| 4,707,080 A | 11/1987 | Fergason ..................... 350/334 |
| 4,919,521 A | 4/1990 | Tada et al. |
| 5,059,245 A | * 10/1991 | Phillips et al. ........... 106/31.65 |
| 5,279,657 A | 1/1994 | Phillips et al. ............ 106/22 R |
| 5,344,594 A | 9/1994 | Sheridon ..................... 264/4.1 |
| 5,364,557 A | 11/1994 | Faris et al. ............. 252/299.01 |
| 5,380,362 A | 1/1995 | Schubert |

(List continued on next page.)

FOREIGN PATENT DOCUMENTS

GB          2276883          10/1994

OTHER PUBLICATIONS

D. Cairnes et al., *SID Digest of technical papers*, XXX, 725–728 (1999).

E. Korenic et al., *Mol. Cryst. Liq. Cryst.* 317, 197–219 (1998).

*Primary Examiner*—Robert H. Kim
*Assistant Examiner*—David Chung
(74) *Attorney, Agent, or Firm*—Kenneth J. LuKacher; Martin LuKacher

(57) ABSTRACT

Flakes or platelets of polymer liquid crystals (PLC) or other birefringent polymers (BP) suspended in a fluid host medium constitute a system that can function as the active element in an electrically switchable optical device when the suspension is either contained between a pair of rigid substrates bearing transparent conductive coatings or dispersed as microcapsules within the body of a flexible host polymer. Optical properties of these flake materials include large effective optical path length, different polarization states and high angular sensitivity in their selective reflection or birefringence. The flakes or platelets of these devices need only a 3–20° rotation about the normal to the cell surface to achieve switching characteristics obtainable with prior devices using particle rotation or translation.

36 Claims, 4 Drawing Sheets

(a) V=0

(b) V=V$_{app}$

U.S. PATENT DOCUMENTS

Figure 1:
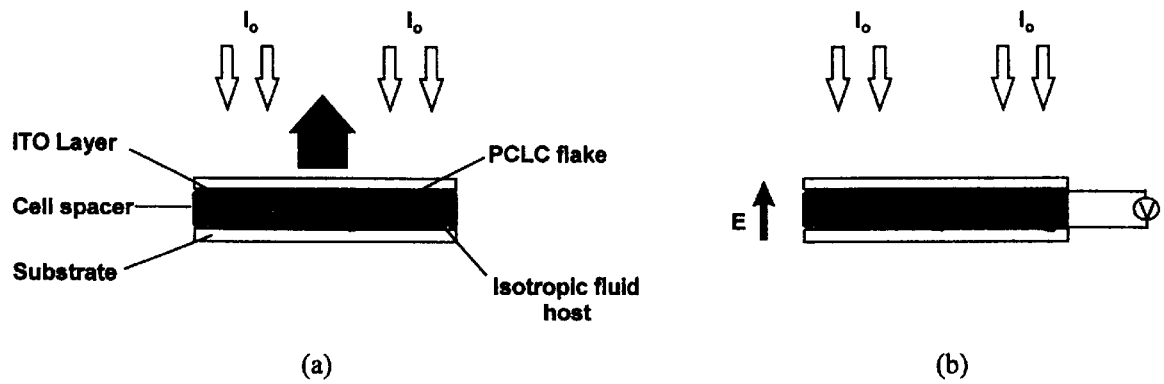

| | | | |
|---|---|---|---|
| 5,389,945 A | 2/1995 | Sheridon et al. | 345/85 |
| 5,523,863 A | 6/1996 | Fergason | 359/52 |
| 5,587,242 A | 12/1996 | Hou et al. | 428/402 |
| 5,650,872 A | 7/1997 | Saxe et al. | 359/296 |
| 5,691,789 A | 11/1997 | Li | 349/98 |
| 5,691,795 A | 11/1997 | Doane et al. | 349/169 |
| 5,708,525 A | 1/1998 | Sheridon | 359/296 |
| 5,717,283 A | 2/1998 | Biegelsen et al. | 313/483 |
| 5,717,514 A | 2/1998 | Sheridon | |
| 5,737,115 A | 4/1998 | Mackinlay et al. | 359/296 |
| 5,739,801 A | 4/1998 | Sheridon | 345/84 |
| 5,751,268 A | 5/1998 | Sheridon | 345/107 |
| 5,754,332 A | 5/1998 | Crowley | 359/296 |
| 5,760,761 A | 6/1998 | Sheridon | 345/107 |
| 5,767,826 A | 6/1998 | Sheridon et al. | 345/84 |
| 5,825,529 A | 10/1998 | Crowley | 359/296 |
| 5,851,604 A | 12/1998 | Muller-Rees et al. | 428/1 |
| 5,961,804 A | 10/1999 | Jacobson et al. | 204/606 |
| 6,017,584 A | 1/2000 | Albert et al. | 427/213.3 |
| 6,291,065 B1 * | 9/2001 | Poetsch et al. | 106/31.15 |

* cited by examiner (a) (b)

a. b.

(a) V=0  (b) $V=V_{app}$ (a) V=0  (b) V=V$_{app}$ (a) V=0  (b) V=V$_{app}$ (a) V=0    (b) V=V_app (a) V=0    (b) V=V_app (a)

(b)

ELECTRICALLY SWITCHABLE POLYMER LIQUID CRYSTAL AND POLYMER BIREFRINGENT FLAKE IN FLUID HOST SYSTEMS AND OPTICAL DEVICES UTILIZING SAME

The United States Government has rights in this invention pursuant to Contract DE-FC03-93SF19460 between the University of Rochester and the Department of Energy, Office of Inertial Confinement Fusion.

FIELD OF THE INVENTION

The invention relates to electrically switchable particle devices employing a system of flakes or platelets of either polymer liquid crystals (PLC) or birefringent polymers (BP) suspended in a fluid host medium. The devices in accordance with the invention are useful in information display, optics, and photonics, including but not limited to, reflective or transmissive information displays capable of color switching and as flexible media for information display applications on either flat or curved surfaces (e.g. large-area signs, automobile dashboards, heads-up displays, and "electronic paper". The invention also provides improved switchable and tunable devices for color manipulation (i.e. switchable or tunable color filters), switchable and tunable optical retardation or modulation elements for polarized light at desired wavelengths or bandwidth, switchable micropolarizers, switchable "smart windows" for either energy or privacy control, switchable conformal coatings for use in decorative applications, and switchable coatings for applications in military security, camouflage, substrate reflectance control, document security, anti-counterfeiting, and object tagging and identification.

BACKGROUND

Considerable research effort has been focused on technologies for information display such as liquid crystal devices, field-emissive devices, plasma devices, and most recently, particle-based image displays. Particle-based displays, initially investigated over 30–40 years ago, rely on the motion of particles suspended in a fluid host medium. The particles respond to an applied electric or magnetic field to produce either a change in reflectivity or color of incident reflected light or to modulate or change the polarization state of transmitted light. Such effects are induced by either translation or rotation of the suspended particles and are based on physical phenomenon such as magnetic polarization, electrophoresis, dielectric polarization or other forms of current-induced effects. C. R. Tate, U.S. Pat. No. 3,406,363 issued Oct. 15, 1968 describes multicolored "micromagnets" of varying magnetic strength made of materials such as barium ferrite, in a liquid suspending medium, and the manipulation thereof by an external magnetic force to produce color displays. W. E. Haas et al, U.S. Pat. No. 4,076,387, issued Feb. 28, 1978 describes metal flakes, such as aluminum, of <325 mesh size (~45 $\mu$m) dispersed in either a water-based or a hydrocarbon-based ferrofluid to construct a reflective display device switched by an electromagnet for use in ambient lighting conditions. In addition, I. Ota, U.S. Pat. No. 3,668,106, issued Jun. 6, 1972, describes an electrophoretic display or recording device based on charged particles manipulated by an electric field that altered the device reflectivity.

C. W. Jacob, U.S. Pat. No. 3,967,265, issued Jun. 29, 1976, describes a light gating display consisting of small conductive particles (aluminum or graphite) dispersed in a continuously circulated dielectric fluid. The device of the Jacob patent is addressed indirectly using an electric field generated by selective illumination of an integral photoconductor, and functions as an image relay or image converter, whether in reflection or transmission. Jacobs mentions that the particle dispersion can be replaced by a pure, particle-free liquid crystal fluid host to produce a device that functions in a similar manner.

U.S. Pat. No. 5,650,872, issued to R. L. Saxe et al. on Jul. 22, 1997, describes a "Suspended Particle Device" (SPD) that relies on sub-micron, anisometric, light-polarizing particles dispersed in a host medium for its function. Application of an electric field causes the particles to reorient. Two-color switching is possible, but very large cell path lengths (125–825 $\mu$m) and high drive voltages (>2000V) are required, and the contrast difference between on and off states is low.

More recently, particle-based devices employing microencapsulation techniques have come to the forefront due to great interest in their use as new forms of flexible, re-writeable, re-usable electronic storage media that could take the place of newspapers or other printed material. Such paper-like information storage media that could be updated electronically from the Internet or other source of stored information is projected to have a large economic impact due to the wide scope of potential applications and market areas that such a device could address. These devices consist of a particle/fluid host dispersion that itself is microencapsulated in a polymeric, film-forming binder material to form a flexible, electrically-addressable sheet with bistable switching characteristics that can retain text and graphics images for prolonged periods of time.

In this connection, N. K. Sheridon et al. in U.S. Pat. Nos. 4,143,103, 4,126,854, 5,344,594, 5,389,945, 5,708,525, 5,739,801, 5,751,268, 5,760,761, 5,767,826, J. M. Crowley in U.S. Pat. Nos. 5,754,332 and 5,825,529, D. K. Biegelsen et al. in U.S. Pat. No. 5,717,283 and J. D. Mackinlay et al. in U.S. Pat. No. 5,737,115, describe various forms of a "Gyricon" device consisting of 50–500 $\mu$m "bi-chromal" glass or polymeric spheres contained within fluid-filled cavities that are themselves encapsulated in a flexible polymer matrix. Each sphere is formed such that its opposing hemispheres are of different colors, and can be made to rotate from 90–180° in the presence of an electrical field applied across the film because the two hemispheres bear opposing surface charges. Drive voltages increase with increasing diameter of the rotating spheres and the cavities containing them, and produce bistable switching. The Gyricon device functions in reflective mode.

Another microencapsulated particle display technology is E-Ink™, described in U.S. Pat. No. 5,961,804 issued to J. Jacobson et al. and by J. D. Albert et al, U.S. Pat. No. 6,017,584. This technology is based on an encapsulated "electrophoretic dispersion" of negatively and positively charged microparticles (<1 $\mu$m in diameter) in an isotropic, dielectric host fluid that in turn is encapsulated in a polymer binder. According to Jacobsen and Albert, microencapsulation of the electrophoretic dispersion is an essential element for avoiding the particle agglomeration and sedimentation that commonly occurs in conventional electrophoretic displays. Unlike the Gyricon device, the E-Ink device functions by translation of particles towards the top or bottom of the microcapsule, depending on the sign of the applied voltage. The particles are generally composed of inorganic or metallic particles that are coated with a polymeric coating. Other pigments, metallic flakes or retroreflectors are added to the electrophoretic dispersions either to produce switching between colors or to producing changes in reflectivity, respectively. A nematic liquid crystal fluid can be used in place of the isotropic, dielectric host fluid in the dispersion to modify the switching threshold and bistability of the device. A. Somlyody et al, U.S. Pat. No. 4,305,807 issued Dec. 15, 1981, reports the use of a nematic liquid crystal as a fluid host for charged-particle displays to provide a threshold response characteristic in a similar manner as the devices of the Jacobsen and Albert patents.

Although many examples abound in both the patent and open literature of particle-based devices employing inorganic or metallic particles, instances of reported electro-optical particle devices that employ birefringent polymers or polymeric liquid crystals as the active particles are nearly non-existent. One example is the use of in-situ polymerized nematic liquid crystal spheres prepared by polymerizing a UV-curable liquid crystal reactive monomer dispersed in glycerol in the presence of an appropriate photoinitiator as reported by D. Cairns et al. in the Society for Information Display (SID) Digest of Technical Papers, XXX, p725–728 (1999). This device differs substantially from those described in the patents described above in that (1) the resultant polymerized nematic liquid crystal spheres are themselves birefringent and bipolar, and (2) these spheres can be reoriented by the coupling of an applied AC electric field to the dielectric anisotropy of the polymerized LC material. Thus, Cairns et al proposes an Electro-Mechano-Optical (EIMO) device which functions similarly to the Gyricon device in that the optical effect is produced by field-induced rotation of spherical particles suspended in a fluid. But unlike the Gyricon device, which functions in reflection, the EIMO device relies on a difference in nematic birefringence produced by the rotation of the polymerized nematic LC spheres to produce the optical effect, and thus operates as a polarization rotation device in transmission only.

In S. Faris et al, U.S. Pat. No. 5,34,557, issued Nov. 15, 1994, particles, or "flakes", generated by thermal fracturing of polymer cholesteric liquid crystal (PCLC) polysiloxane films which are aligned in the Grandjean texture are disclosed. These flakes range in size from hundreds of microns to less than a micron, and exhibit optical properties identical to the parent films from which they were derived. Because they originate from an aligned PCLC film that has a relatively high glass transition temperature ($T_g$), their unique optical properties (selective reflection wavelength, birefringence) and alignment quality are "frozen-in" and are thus essentially insensitive to thermal or mechanical disruptions. These unique optical properties can be transferred to other polymer "hosts" by dispersing the flakes into a solution of the polymer and using it as a binder to prepare passive (i.e. non-switchable) conformal coatings with unusual optical properties for applications ranging from document security to exterior coatings for motor vehicles. Other methods of generating PLC flakes and pigments have also been reported by I. A. Shanks et al.. in U.K. Patent 2,276,883, C. Muller-Rees et al. in U.S. Pat. No. 5,851,604, R. W. Phillips in U.S. Pat. No. 5,279,657 and W. Hou et al. in U.S. Pat. No. 5,587,242. Very recently, Faris et al have also reported a method for preparing patterned platelets based on photocrosslinkable PCLC materials.

The hue, saturation and brightness of PCLC films have all been extensively studied. The color properties and chemical compatibility of PCLC flakes in some host fluids were first studied by E. Korenic et al., as reported in Mol. Cryst. Liq. Cryst. 317, 197–219 (1998). Two-color superimposed coatings have an additive color mixture, which differs from the subtractive color effects obtained with conventional inks, dyes or pigments. Because the colors are highly saturated and show a dependence on the angles of illumination and observation, their visual appearance has been used as the basis for art or the manufacture of commercial products such as paints and cosmetics. L. Li, in U.S. Pat. No. 5,691,789, proposes that specialized curing cycles for thermally or photochemically cross-linkable PCLCs can be used to induce a pitch gradient into the PCLC film. By controlling the gradient of the pitch, films with broad reflectance bands ranging from the visible to the near IR can be fabricated. One application of these materials is as broadband, non-absorptive polarizers in LC displays.

SUMMARY OF THE INVENTION

It has been discovered in accordance with the invention that when flakes or platlets of polymer cholesteric liquid crystals (PCLC) or other birefringent polymer (BP) materials are dispersed or suspended in a fluid host to provide a flake/host system, they are suprisingly sensitive to an applied electric field and are readily switchable to different angular orientations. As will be apparent from the above discussion of the prior patents and publications, the sensitivity of those flakes or platelets when dispersed or suspended in a fluid host has not heretofore been appreciated. These flakes or platelets are referred to generically as electrooptically sensitive flakes hereinafter. The performance of devices according to the invention is dependent on both the character of the electrooptically sensitive flakes and the host, which preferably have the following characteristics, 1) The flake material is chemically compatible with the host medium (i.e., completely insoluble);
2) The density of both the flake material and the host medium is as closely matched as possible to aid in keeping the flakes uniformly suspended in the host and prevent them from agglomerating, settling to the bottom, or rising to the top of the device;
3) The host fluid has a high a resistivity ($\geq 10^9$ Ω-cm) sufficient to eliminate competing electrohydrodynamic effects;
4) The flakes are within the range of 20–40 μm wide with a length-to-width ratio of 2–3 to observe optimal switching and contrast;
5) The viscosity of the host material is the lowest value as will maintain the flakes in suspension to minimize response time;
6) The index of refraction of the flake material and the host fluid is closely matched as possible to avoid scattering losses.

BRIEF DESCRIPTIONS OF THE DRAWINGS

FIGS. 1(a) and (b) are schematic, cross-sectional views of devices in accordance with the invention which show the reorientation and resultant change in reflected light intensity for PCLC flakes with a green selective reflection wavelength dispersed in an fluid host medium that is isotropic. The inner surfaces of the cell substrates are coated with a transparent conductive coating, typically indium tin oxide (ITO). Glass fibers, beads, or Mylar strips are used as cell spacers to set the fluid gap spacing, which is generally less than or equal to the longest dimension of the flake. In FIG. 1(a), which is the off-state of the device with no electric field applied, the flakes lie nearly parallel to the substrates and selectively reflect a circularly polarized green component ($\lambda_r$) of the incident light ($I_o$). In FIG. 1(b), when an electric field is applied to the device, the flakes rotate through an angle of 3–20° from the normal to the substrates, which exceeds the acceptance angle for selective reflection, and the reflected green component ($\lambda_r$) of the incident light ($I_o$) is extinguished, and the device enters a non-reflective, dark state.

FIGS. 2(a) and (b) are cross-sectional views of a pure PCLC flake [FIG. 1(a)], and the same PCLC flake (solid area) coated with a charge control layer (patterned area) [FIG. 1(b)]. The charge control layer is formed by deposition of a solution of a charge control agent and a polymeric material (typically the same PCLC material that composes the flake) on one surface of the parent PCLC film from which the flakes are derived.

FIGS. 3(a) and (b) are perspective views of a device according to the invention which schematically illustrate the guest-host switching of PCLC flakes with green selective reflection, shown as shapes in the Figures, when they are mixed into and suspended in a nematic liquid crystal host, which is shown as dashes in the Figures. Transparent conductive coated substrates similar to those of FIG. 1 are coated with Nylon 6/6 and the Nylon layers are buffed before the cell is assembled and filled with the flake/liquid crystal host suspension to induce uniform molecular alignment of the LC host. The cell gap dimension is larger than the longest dimension of the PCLC flakes. In the off-state, FIG. 2(a), both the guest flakes and the host LC molecules align with their longest dimension parallel to the cell walls, and green selective reflection is observed. In FIG. 2(b), application of an AC electric field to the device causes the LC host to align parallel to the electric field, and the PCLC flakes are forced to follow the orientation direction of the host. The large angle of reorientation of the flake/host mixture greatly exceeds the acceptance angle for selective reflection, and the green selective reflection color is muted or extinguished. The PCLC flakes play a passive role in this device since they possess no inherent dielectric anisotropy or surface charging, and the switching characteristics are governed primarily by the properties of the LC host medium.

FIGS. 4(a) and (b) are perspective views of a device according to the invention which schematically illustrate a suspension of PCLC flakes in a fluid medium (the host/flake system) encapsulated in a film of transparent polymer. With no electric field applied [FIG. 4(a)], the flakes adopt a random distribution in the spherical microcapsules, and the selective reflection color of the flakes is substantially muted or nonexistent. Application of an electric field across the microencapsulated film [FIG. 4(b)] causes the flakes to adopt a uniform orientation with the long axis of the flake normal to the applied field and parallel to the long film dimension. With the flakes now normal to the incident light, selective reflection occurs and the reflected color of the device is greatly intensified. For best performance, the refractive index of the polymer binder and the isotropic host fluid are matched.

Figure 3:
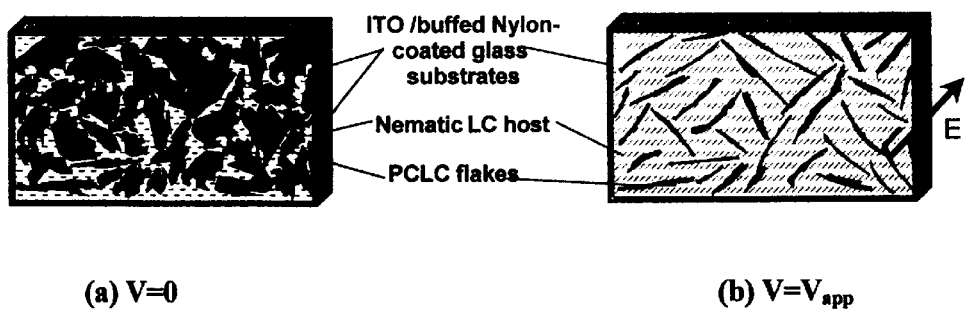
Figure 4:
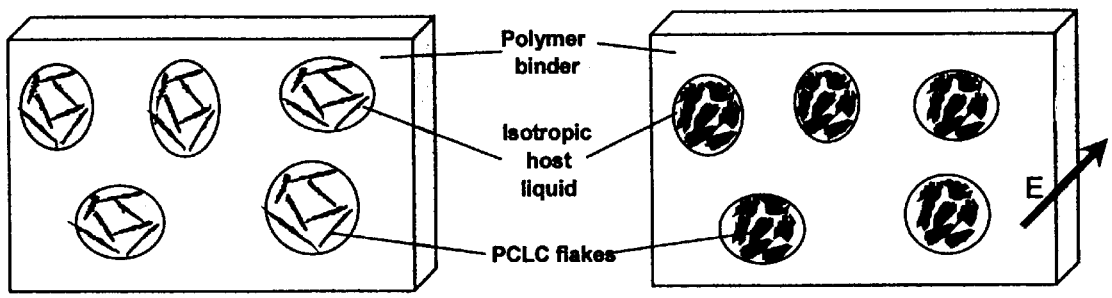

FIGS. 5(a) and (b) are views similar to FIGS. 4(a) and (b) and show a device similar to that shown in FIG. 4, except that the PCLC flakes in the microcapsules are suspended in a birefringent nematic liquid crystal host material instead of an isotropic fluid. Here the device switches from a scattering texture in the field-off state (FIG. 5(a)) to a colored reflective state (FIG. 5(b)) when the electric field is applied. As in FIG. 3, the PCLC flakes have no appreciable dielectric anisotropy or surface charging and thus behave as passive guests in the nematic host. The refractive index of the polymer binder matches the ordinary refractive index of the liquid crystal host closely to minimize haze. The liquid crystal host also possess a large negative dielectric anisotropy.

FIGS. 6(a) and (b) are views similar to FIGS. 4(a) and (b) with the exception that a dye has been added to the PCLC flake/fluid system before microencapsulation. The addition of the dye allows the device to switch between two different color states, as opposed to reducing the intensity of the reflected light in one state, as occurs in the device of FIG. 4.

FIGS. 7(a) and (b) are views similar to FIGS. 4(a) and (b) and portray electric field-induced switching in PCLC/fluid host systems when they are encapsulated in a polymer binder that can be processed to produce a film containing elliptical microcapsules. The minor axis of the elliptical microcapsule is less than or equal to the longest dimension of the flake, which causes the flakes within the microcapsules to align spontaneously with the both the major axis of the microcapsule ellipsoid and the film draw direction. These conditions produce a preferred direction of orientation by steric factors. With no electric field applied [FIG. 7(a)], the flake surfaces are oriented parallel to the film surface and normal to the incident light, and selective reflection occurs. The selective reflection color is lost when an electric field is applied across the short dimension of the encapsulated film [FIG. 7(b)] and the flakes rotate out of the surface plane of the film similar to what occurs in the device of FIG. 1. As in FIG. 6 above, a dye may be added to the isotropic fluid host for color switching and tunability between the absorption state produced by the dye and the selective reflection state produced by the PCLC flake.

Figure 8:
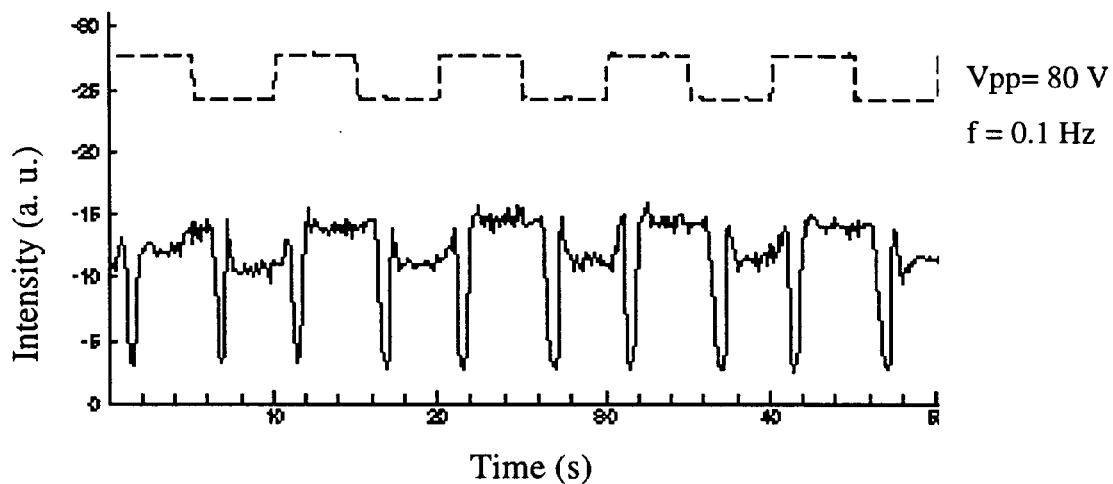
Figure 8:
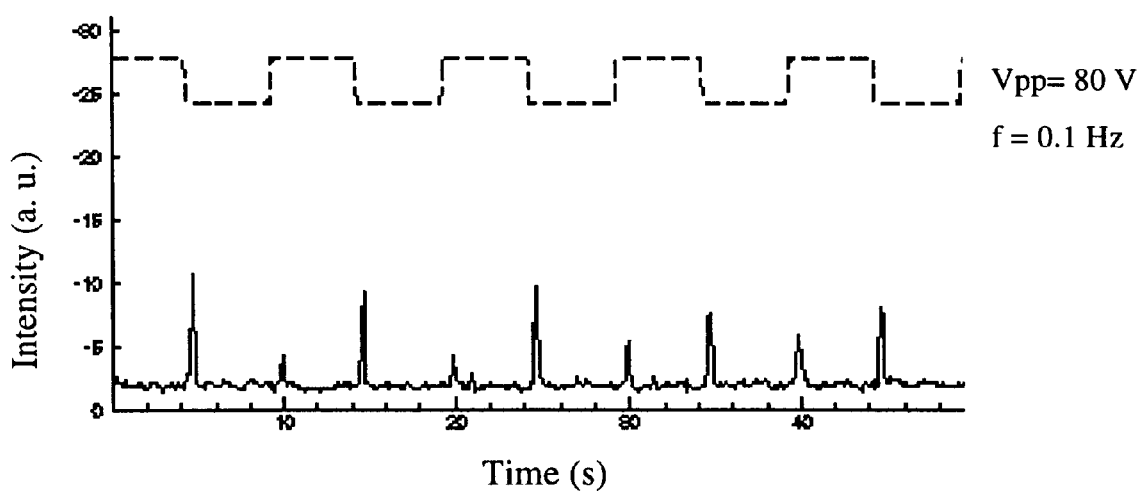

FIGS. 8(a) and (b) are plots showing the electro-optical response of the device of FIG. 1 fabricated as per Example 1 below. In FIG. 8(a), the optical response of the device is shown when illuminated at normal incidence, and FIG. 8(b) shows the optical response of the device when illuminated at non-normal incidence. For both FIGS. 8(a) and (b), the top trace is the driving waveform and the bottom trace is the optical response as measured by a detector.

DETAILED DESCRIPTION

The electrooptically sensitive flakes may be PLC flake materials produced by methods such as those described by S. Faris et al, in U.S. Pat. No. 5,364,557, (see also Faris, U.S. patent application Ser. No. 09/196,583 filed Nov. 20, 1998) and can be in the form of either polymer nematic liquid crystals (PNLC) or polymer cholesteric liquid crystals (PCLC). The electrooptically sensitive flakes may be birefringent polymers (BP) that do not possess liquid crystalline properties, such as multilayer polarizing pigments which are sold commercially by 3M Company of St. Paul, Minn., USA. In the simplest embodiment of the device (FIG. 1), the PNLC, PCLC, or BP flakes are dispersed in the host medium and the flake/host suspension is confined between two glass substrates that bear electrically conductive coatings on the surfaces in contact with the flake/host suspension. The fluid gap of the electro-optical cell thus formed can be controlled by Mylar spacers, glass fibers, glass/plastic spheres, or by more advanced techniques such as photolithography or chemical vapor deposition, and the gap is typically at least as large as the largest cross-sectional dimension of the flakes.

FIG. 1 shows the basic device configuration and switching behavior for the case when the flakes are composed of a PCLC material. Typical dimensions of the flakes used in the various embodiments of the device are from 20–40 μm long with a aspect ratio (length-to-width) of 2–3 and a thickness of 5–7 μm. Application of an electric field to the device initiates flake rotation with a resultant change in the optical properties (i.e., selective reflection color or birefringence) of the device. Because of the large effective optical path length and the high angular sensitivity of the selective reflection of the PCLC flakes, it is only necessary for the flakes to rotate 3–20° about the normal to the cell surface to achieve switching characteristics. Note that a much larger degree of rotation (e.g., Gyricon) or translation (e.g., E-Ink) of the active particles has heretofore been required. In addition, the unique optical and polarizing properties of the PLC flakes allow the devices of this invention to be applied to a considerably broader scope of applications, such as in areas of optics and photonics, than is possible with any of the devices described in the known patent literature.

In all of the herein described embodiment where PLC flakes are used, the flake and the host materials have the following characteristics: (1) the PLC flake material is chemically compatible with the host medium; (2) the density of the PLC flake material and the host medium is closely matched to prevent agglomeration, sedimentation, or separation of the flakes from the host; (3) the viscosity of the host material is sufficiently high to maintain the suspension but as low as possible to minimize response time, (4) the resistivity of the host fluid is sufficiently high to avoid competing electrohydrodynamic effects and (5) the index of refraction of the PLC flake material and the host fluid is closely matched to avoid scattering losses.

The nature of the electric field used to drive the device in its various embodiments depends on both the composition of the flake material and the fluid host. If the flake material is composed, for example, of a material such as a PNLC or PCLC that possesses a sufficiently large value of the dielectric anisotropy, then an AC electric field may be used to initiate the switching process. Such materials can be prepared in pure form by synthesis. Low molar mass liquid crystal fluids with either a very low or nonexistent dielectric anisotropy can be modified by admixing or doping them with quantities of other low molar mass additives with a very large value of the dielectric anisotropy to impart a finite value of dielectric anisotropy to the entire mixture. It is a feature of the invention to provide the effect of dielectric anisotropy by the addition of such low molar mass, high dielectric anisotropy dopants to commercially available polymer CLC materials with very low or a nonexistent dielectric anisotropy for formation of PCLC flakes that can be reoriented by AC fields.

Alternatively, for flake materials that substantially lack dielectric anisotropy, DC fields can be used to reorient the flakes through coupling with stored surface charges on the flake surfaces. This DC switching process can be enhanced using charge control agents. A representative sample of such charge control agents are listed in Table 1. Many of these charge control agents also function as surfactants to aid in preventing particle agglomeration and sedimentation. These charge control agents can be either added directly to the host fluid or applied directly to the surface of the flake in such a manner so as to insure that the charge control agent does not dissociate appreciably into the host fluid matrix. One way to accomplish the latter is to imbibe the charge control agent into a film-forming polymeric material, thus forming a "charge-control layer" that is solution-cast directly onto the parent PLC or BP film prior to flake formation. The most desirable way to accomplish the above is for the film-forming polymeric charge control layer to be made of the same material as parent PLC or BP film. This approach insures the greatest degree of thermal and chemical compatibility between the flake and the charge-control layer without substantially altering the optical properties of the external surfaces of the flakes. FIG. 2(b) schematically depicts a flake bearing such a charge-control layer.

TABLE 1

Charge Control Agents

| Positive Charge | Negative Charge | Unspecified Charge |
|---|---|---|
| Polyisobutylene succinic Anhydride | Polyisobutylene succinimide | Phenol Resin |
| | Barium pertonate | Bis-(2-ethylhexyl) sodium |
| Cobalt naphthenate | Barium sulfonate | sulfocussinate (AOT) |
| Cupric naphthenate | Barium dinonyl- | Calcium dodecyl benzene |
| Zirconium octoate | naphthalenesulfonate | sulfonat |
| Zinc octoate | Polyvinyl pyridine | Calcium petroleum sulfonate |
| Calcium octoate | Pyridine | Triton-X 100 |
| Polyvinyl alcohol | Lecithin | Polystyrene/AOT |
| Polyacrylic acid | Polyvinyl acetate | Polyisobutylene/AOT |
| Polymethacrylic acid | Polyethylene oxide | Poly(vinyl methyl ether)/AOT |
| Polyvinyl chloride | Polymethyl methacrylate Polyacrylamide Polyesters | Sodium salt of an organic sulfonic acid |

The host material can be selected from several isotropic dielectric fluid materials. Fluorosilicone oils are preferred as hosts because their low viscosity, high resistivity, and low refractive index aids in optimizing flake motion and in reducing scattering losses, respectively. Additionally, the higher density of fluorosilicones aids in preventing sedimentation of the suspended PLC flakes. Dielectric host fluids that can serve to function effectively in devices provided by the invention are listed in Table 2. Nematic liquid crystal fluids can also be used as host materials, however because the nematic LC material possesses both optical and dielectric anisotropy in its own right, it will substantially alter both the optical characteristics and switching performance of the resultant devices as compared to those using an isotropic host.

TABLE 2

| Hydrocarbons | Other | Oils |
|---|---|---|
| Toluene | Tetrafluorodibromoethane | Silicone oils |
| Xylene | Tetrachloroethylene | Flourinated oils |
| Octane | Oligomer trifluorochloroethylene | Paraffin liquid |
| Decane | Perchloroethylene/xylene | Kerosene |
| Tetradecane | Tetrachloroethylene/xylene | Linseed oil |
| Decalin | Tetrafluorodibromoethane/ trichlorotrifluoroethane | Soya oil Tung oil |
| | Trifluorochloroethylene | Olive oil |

The presence of a surfactant in the host material can be beneficial in insuring that the flakes stay uniformly dispersed and suspended in the dielectric medium, and can also aid in preventing flakes from becoming immobilized at the cell electrode surfaces. The charge control agents listed in Table 1 are also surfactants, and perform both charge control and flake suspension control functions simultaneously.

The following are examples of the selection of flake and/or host materials which give a device such as shown in FIG. 1 with certain specified characteristics.

EXAMPLE A

The flakes are of PCLC material, such as non-crosslinkable cyclic polysiloxane liquid crystal polymer (CLC535 LC polysiloxane, from Wacker Chemie) or a photopolymerizable CLC polymer systems such as the cross-linkable polysiloxane CLC polymer systems supplied by Wacker Chemie or the cross-linkable acrylate CLC polymers produced by BASF. Flakes generated from these materials are dispersed in a fluorosilicone oil or one of other hosts in Table 2 to which a charge control agent selected from the group in Table 1 has been added. Such a device switches from a green selective reflection state to a dark state upon application of a DC electric field, and is useful, as for example, a reflective display device, a switchable narrow band mirror, or a switchable color filter.

EXAMPLE B

The PCLC flakes may be generated from pitch gradient PCLC films prepared as described by L. Li in U.S. Pat. No. 5,691,789 dispersed in a fluorosilicone oil or other host from Table 1 along with a charge control agent from Table 2 to produce a switchable, broad-band reflective device operating over very broad regions of the UV, visible, or IR spectrum. An applied DC field may be used to switch the device.

EXAMPLE C

Figure 2:

The PCLC flakes may be a mixture of PCLC flakes having different selective reflection colors, with flakes in each color group coated with a "charge-control layer" containing a different concentration of charge control agent selected from Table 1, as shown in FIG. 2,. Each color group of flakes, when dispersed in a dielectric host fluid such as a fluorosilicone oil or a host selected from Table 2, responds to a different level of applied DC voltage. Consequently, each color could be addressed individually or in combination with other colors to produce, for example, a full-color reflective information display device, a variable optical filter, or a tunable mirror for a Fabry-Perot cavity.

EXAMPLE D

The flakes may be of a PNLC material or other birefringent polymer (BP) dispersed into a dielectric host such as a fluorosilicone oil or one of the hosts listed in Table 2 containing a charge control agent selected from Table 1. Such a device functions as a transmissive, electrically variable optical retardation device that can be switched or tuned by an applied DC field.

EXAMPLE E

The PCLC flakes may be patterned PCLC flakes. Such patterned flakes may be made in specific shapes (i.e. circles, ovals, squares, rectangles, triangles, and three-dimensional shapes), well-controlled sizes, and specific color ranges, or formed to bear spatial markings such as raised or lowered portions, letters, numbers, shapes, apertures, or notches, patterned flakes and methods of making same are described in the above referenced U.S. patent application Ser. No. 09/196,583. They may be formed so as to possess different spectral properties on different areas of the flake surface. Patterned particles as described above may be dispersed in a dielectric host medium such as a fluorosilicone oil or one of the hosts in Table 2 with a charge control agent selected from Table 1 to produce a switchable device for storing or displaying coded information. Such a device would find applications in areas such as military security and camouflage, document security, anti-counterfeiting, and object tagging and identification.

For any of the five previously described examples, if the dielectric host fluid is modified by the addition of a small amount of a cross-linkable polymeric substance similar to that described by J. W. Doane et al. in U.S. Pat. No. 5,691,795 for polymer stabilized liquid crystal (PSLC) systems, a polymer network is introduced into the flake-host system to "gel" the material and stabilize its performance. Such a system would be especially desirable for preparing devices capable of bistable switching with long-term information retention (ie, "memory"), including optical information storage devices.

In addition, for any of the five previously described examples, with or without the gel host, the dielectric host fluid and charge control agent may be replaced by a nematic liquid crystal fluid. The dispersed flakes will then behave as passive "guest" particles suspended in the nematic "host". The electrical switching properties (e.g. threshold voltages, response times) will now be governed primarily by coupling of the applied electric field with the dielectric anisotropy of the low molar mass LC host, and such devices can be switched by an applied AC electric field. FIG. 3 depicts this schematically for PCLC flakes dispersed in a nematic LC host fluid possessing positive dielectric anisotropy.

For any of the previously described examples with or without a gel host, and with or without a nematic LC host, if the PCLC or PNLC flakes used are composed of (1) materials with a large value of the dielectric anisotropy, whether it is inherent to the pure material or obtained by doping or admixing with a low molar mass additive, and (2) neither the host material nor the flakes contain any charge control agents as in Examples A and C above, then the mechanism for electrically-induced switching will be based on coupling of the applied electric field to the flake dielectric anisotropy rather than surface charges; thus, enabling electrical switching or addressing using an AC field.

If the suspension of PCLC flakes from different color groups are prepared so that the flakes in each color group (Example C) have a different value of dielectric anisotropy, each color group of flakes may respond to a different level of applied AC voltage and/or frequency. Consequently, each color may be addressed individually or in combination with other colors to produce, for example, a full-color reflective information display device, a variable optical filter, or a tunable mirror for a Fabry-Perot cavity that can be addressed using AC fields of different strengths or frequencies. One convenient way of obtaining such a mixture of flakes with different values of dielectric anisotropy using the same base PLC material system is by doping or admixing the base system with a low molar mass additive with a large dielectric anisotropy as described above.

Referring to FIGS. 4–7, there are shown embodiments of devices according to the invention which can be generated by encapsulation of the PLC flake/host systems described in any of the previous examples into a polymer "binder" solution in which neither the flake material nor the fluid host has any appreciable solubility or affinity, (e.g., a water soluble film-forming polymer such as an acrylic emulsion, polyethylene oxide, polyvinyl alcohol). This new suspension, when cast into a film and cured, forms a polymer layer that has microscopic, fluid-filled occlusions, or voids, containing freely suspended PLC flakes (encapsulated flake/host systems). This film can be cast onto either a rigid or flexible transparent substrate material, such as glass or Mylar, that bears a conductive coating such as indium-tin oxide (ITO). A second transparent substrate also bearing a ITO coating can be laminated to the exposed surface of the film with the ITO-coated surface in contact with the film. If an electric field is applied to the resultant sandwich cell, the flakes are free to rotate in the fluid-filled voids. The resultant film can be used as a conformil coating on substrates of various shapes and sizes. The device is thus robust physically and retains the unique optical properties of the PLC flakes. The conformal coating may be electrically tunable.

The device shown in FIG. 4 has flakes of PCLC material and fluid host entrapped in spherical cavities in a polymer binder film. In this particular embodiment, the device functions in "reverse-mode " as compared to the FIG. 1 embodiment, in that when the device is in the field-free off-state (FIG. 4(a)), the green selective reflection color is muted, and when the electric field is applied (the "on"-state), as shown in FIG. 4(b) the magnitude of the selective reflection is intensified.

Consider the following examples for fabrication of devices having flake/host systems which are encapsulated. The cavities containing the flake/host systems are capsules thereof These capsules may be of miscroscopic size (a few hundred micron diameter or less) and thus may be called microcapsules.

EXAMPLE F

Flakes of PCLC material are employed as described in Example A, namely non-crosslinkable cyclic polysiloxane liquid crystal polymers (.e.g., Wacker CLC535), photopolymerizable polysiloxane CLC polymer systems from Wacker Chemie, or cross-linkable acrylate CLC polymers produced by BASF. Such flakes are dispersed in a host material selected from Table 2 containing a charge control agent(s) selected from Table 1. This suspension is then microencapsulated in a suitable film-forming binder material that itself contains a surfactant or series of surfactants and is cast as a film on rigid or flexible substrates bearing transparent conductive coatings. Such a device may contain roughly spherical microcapsules filled with the flake/fluid host mixture that would switch from a darker gray or hazy state to a bright (green) selective reflection state upon application of a DC electric field. Uses for such a device include as either a rigid or flexible media for information display applications on either flat or curved surfaces (large-area signs, automobile dashboards, heads-up displays, and "electronic paper"), switchable "smart windows" for either energy or privacy control, switchable conformal coatings for use in decorative applications, and switchable coatings for applications in military security, camouflage, substrate reflectance control, document security, anti-counterfeiting, and object tagging and identification.

EXAMPLE G

The PCLC flakes are generated from pitch gradient PCLC films prepared as described in U.S. Pat. No. 5,691,789 (L. Li). These pitch-gradient flakes are suspended and microencapsulated as in Example F and cast as a film on rigid or flexible substrates bearing transparent conductive coatings to produce a mechanically rigid or flexible broad-band reflective device or conformal coating operating over very broad regions of the UV, visible, or IR spectrum. Such a coating is a switchable by an applied DC electric field.

EXAMPLE H

A mixture of PCLC flakes with different selective reflection colors is used with flakes in each color group coated with a "charge-control layer", as shown in FIG. 2, containing a different concentration of charge control agent. As in Example C, each color group of flakes responds to a different level of applied DC voltage and thus each color could be addressed individually or in combination with other colors. If this flake/host suspension is in turn microencapsulated in a film-forming polymer binder, as described in Example F, and the resultant emulsion is cast on rigid or flexible substrates bearing transparent conductive coatings, mechanically rigid or flexible devices such as full-color reflective information displays, switchable conformal coatings for use in decorative applications, switchable coatings for applications in military security, camouflage, substrate reflectance control, document security, anti-counterfeiting, and object tagging and identification can be produced.

EXAMPLE I

A flake/host suspension of a PNLC material or other birefringent polymers dispersed and microencapsulated into a dielectric host and a film-forming polymer binder, respectively. When cast onto flexible or rigid substrates bearing transparent conductive coatings, such a device can function as a transmissive, electrically variable optical retardation device switchable by a DC electric field.

EXAMPLE J

Patterned PCLC flakes are used. Such flakes may be produced as described in detail in Example E. If such patterned particles are suspended into a dielectric host and the suspension is dispersed into a microencapsulated film-forming polymer binder as described in Example F and this emulsion is cast onto flexible or rigid substrates bearing transparent conductive coatings, a switchable device can be formed capable of displaying coded information in the form of circles, ovals, squares, rectangles, triangles, and three-dimensional shapes, spatial markings (raised or lowered portions, letters, numbers, apertures, or notches) in specific color ranges, or with different spectral properties. Such a device would have numerous applications in areas such as military security and camouflage, document security, anti-counterfeiting, and object tagging and identification.

For any of Examples F–J the dielectric host fluid may be a gel, as formed by the addition of a small amount of a cross-linkable polymeric substance similar to that described by J. W. Doane et al. in U.S. Pat. No. 5,691,795 for polymer stabilized liquid crystal (PSLC) systems. Each flake/fluid host system contained within each of the microcapsules is "gelled". The gelling can stabilize performance. Such a system may be especially desirable for preparing devices capable of bistable switching with long-term information retention (i.e., "memory"), including optical information storage devices and "electronic paper".

Figure 5:
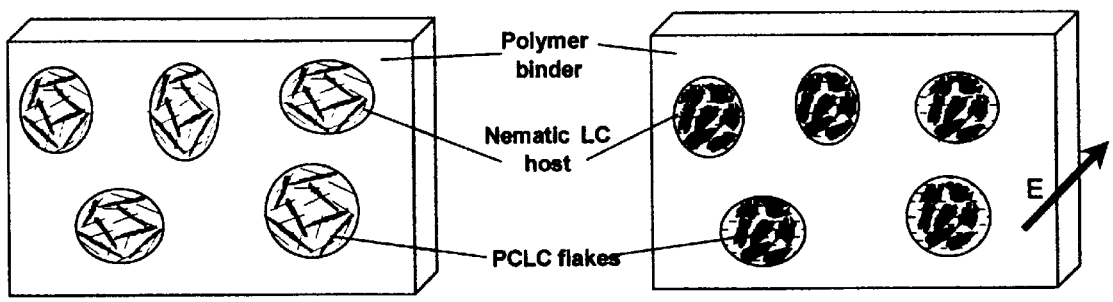

If the dielectric host fluid and charge control agents in the microcapsules are replaced by a nematic liquid crystal fluid (see FIG. 5), the dispersed flakes will behave as passive "guest" particles suspended in the nematic host fluid. The electrical switching properties (e.g. threshold voltages, response times) will be governed primarily by coupling of the applied AC electric field with the dielectric anisotropy of the low molar mass LC host. The mechanism is akin to both nematic curvilinear aligned phase (NCAP) and polymer-dispersed liquid crystal (PDLC), as described by J. L. Fergason in U.S. Pat. No. 4,707,080 and J. W. Doane et al. in U.S. Pat. No. 4,688,900, respectively. The mechanism using a nematic host in accordance with this invention differs in that the optical effect produced results from a combination of the specific optical properties of the ordered nematic LC host and the guest flakes. In FIG. 5 the microcapsules contain PCLC flakes dispersed in a nematic LC host fluid with negative dielectric anisotropy. The microcapsules are encapsulated in a polymer binder.

In the examples involving microcapsules each with a flake/host system, the PCLC or PNLC flakes used in the flake/host system may be composed of (1) materials possessing a large value of dielectric anisotropy, whether it is inherent to the pure material or obtained by doping or admixing with a low molar mass additive, and (2) host materials and flakes without any charge control agents. Then the mechanism for electrically-induced switching is based on coupling of the applied electric field to the flake dielectric anisotropy rather than surface charges. Thus, electrical switching or addressing using an AC field is enabled.

Also in the examples involving microcapsules (FIGS. 4–7), mixtures of PCLC flakes in the different color groups (Example H) include flakes in each color group with a different value of dielectric anisotropy from that of the other groups. Then each color group of flakes may respond to a different level of applied AC voltage and/or frequency. Consequently, each color may be addressed individually or in combination with other colors to produce devices that can be addressed using AC fields of different strengths or frequencies.

Figure 6:
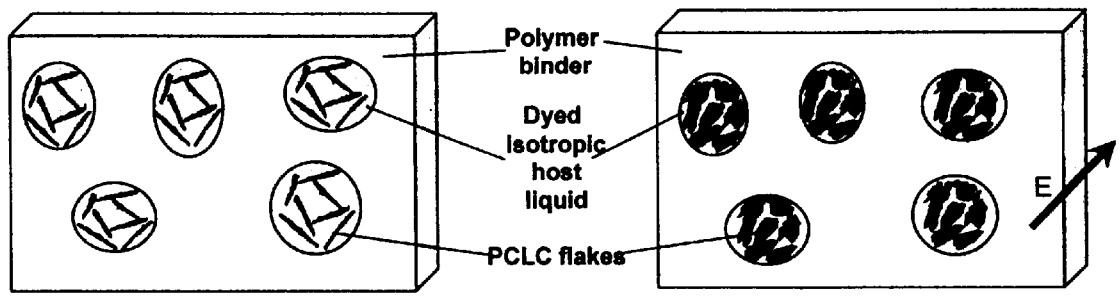

Referring to FIG. 6, an additional level of color switching capability may be provided by doping or admixing an oil-soluble dye to the flake/host mixture. This dye is dissolved in the fluid-filled microcapsules when the flake/host mixture is encapsulated and remains disolved. The use of an isotropic dye results in a constant background color that does not change with the application of the electric field. The use of a dichroic dye produces an additional, switchable source of color independent of that produced by the flake material. An example of this type of device using the same flake and host materials in a microencapsulation media that produces spherical microcapsules is shown in FIG. 6.

Figure 7:
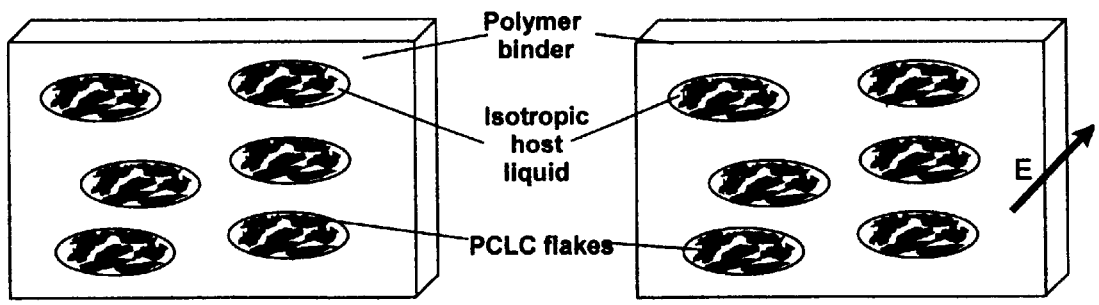

Referring to FIG. 7, the flake/host systems similar to those described above are microencapsulated into a polymer binder that is sheared during the curing process to produce microcapsules that are elliptical rather than spherical in shape. J. L. Fergason, U.S. Pat. No. 5,523,863 may be referred to for a method of making polymer films containing elliptical capsules of liquid crystal material. The asymmetric shape of the microcapsules affects the optical switching characteristics of the device embodiments based on microencapsulation. In FIG. 7, the minor axis of the elliptical microcapsule is less than or equal to the longest dimension of the flake. This causes the flakes within the microcapsules to spontaneously align with the major axis of the microcapsule ellipsoid, thus producing a preferred direction of orientation by steric factors.

Multi-element or "pixelated" arrays of devices of FIGS. 1 to 7 such as a matrix where each display element is separately addressed may provide a high-information density color display. Because only a small degree of flake rotation is required in order to achieve an substantial optical effect, the flake host systems may be especially useful in device geometries where the electric field is applied parallel to the substrates.

Another feature of the invention is in the use in devices described herein of the selective reflection properties of PCLC flakes to generate color rather than by absorption mechanism of dyes and absorbing pigments. The devices of the invention are thus enabled to withstand higher levels of photon flux (i.e. optically-induced damage). This feature is a distinct advantage in applications where such devices may be subject to either high peak power sources (e.g., pulsed or cw lasers) or other forms of optical radiation (e.g. strong sunlight or ultraviolet light).

EXAMPLES OF FABRICATION METHODS

Example 1

To fabricate the device of FIG. 1 (Example A), PCLC flakes were produced from 5–7 $\mu$m thick, thermally-cast films of Wacker CLC535 polycyclosiloxane LC polymer (green selective reflection) by processing the film according to the procedure described by Faris et al. in U.S. Pat. No. 5,364,557. The resultant PCLC flakes consisted of a plurality of widely-varying flake sizes that were separated into size groups by dispersing them in a suitable solvent (e.g., methanol) and pouring the flake slurry though a series of sieves with meshes corresponding to the desired size distribution (ideally, between 20–40 $\mu$m). The sized flake slurry was allowed to air dry until the solvent had evaporated. Approximately 10–20 $\mu$g of one or more charge control agents selected from Table 1, one of which was typically Aerosol TO, were added to 20 g of a selected dielectric isotropic host fluid (typically a fluorosilicone oil). The total of these charge control agents added can range from 0.01–1 wt % of the entire mixture. Optionally, an additional 10–20 mg of a surfactant such as a poly(ethyleneglycerol) or a plurality of surfactants from 0.001–1 wt % of the entire mixture may also be added to the host fluid to help disperse the flakes and prevent their agglomeration, sedimentation, and immobilization on the cell wall electrodes. After dissolution of the charge control agents and surfactants, 50 mg of sized PCLC flakes were added to 1 g of the host/charge control agent/surfactant mixture (approximately 3–6 wt % of the entire mixture) for use in a test cell. The flakes were dispersed into the host using either a magnetic stirrer, an ultrasonic bath, or a shaker device, with the shaker device being the preferred method. Agitation was continued until all of the flakes were uniformly dispersed. Two 1"×1" glass substrates, each bearing a 500 Å layer of indium tin oxide (ITO) conductive coating, were used to construct the device. The fluid gap between the substrates, typically 40 $\mu$m, was set by deposited glass or plastic beads or fibers onto the conductive surface of one of substrates, but Mylar strips or any other spacer materials known to those skilled in the art could also be used. A small amount of the PCLC flake suspension was then deposited onto the substrate, and the second substrate was placed with its conductive surface face-down on top of the first to form a sandwich cell. Alternatively, the two substrates could be assembled first using the spacer materials described above and the flake suspension could be drawn into the empty cell gap by capillary action. The cell was sealed around the periphery of the fluid gap with an epoxy sealing material to contain the suspension within the cell. Application of a series of +/−40 V DC pulses of opposite polarity to the device produced loss of intensity of the bright green off-state color of the flakes. The optical response of the device is shown in FIGS. 8a and b.

Example 2

To produce PLC flakes containing a charge control layer as described in Example C, 15 g of Wacker CLC535 cyclopolysiloxane LC polymer was dissolved in 30 g of either toluene or methylene chloride. A charge control agent, typically Aerosol TO (30 mg, 0.2 wt %) was added to the mixture and the components were mixed on a magnetic stirrer. This CLC polymer/charge control agent solution was deposited as successive charge-control layers onto a 5–7 $\mu$m thick pure CPC 535 film that had previously been thermally-coated onto a substrate. The number of layers that are applied can be used to control the final concentration of the charge control agent in the charge control layer. Charge control layers were cast onto the pure CLC535 base film using both knife coating and spin coating techniques, but the latter was found to be the preferred method because it produced highly uniform films with good reproducibility.

After deposition of the charge control layer, the PLC film was heated well above its glass transition temperature and aligned by shearing to obtain a monodomain alignment condition with high-quality selective reflection. The latter was achieved by (1) heating the PLC film above its glass transition temperature on a hot plate; (2) laminating a piece of Kapton film onto the PLC film, and (3) returning the laminated films to the hot plate. The Kapton film was pulled back and forth across the PLC film to create the shearing motion, which induces uniform molecular alignment in the PLC film. The film was then annealed in an oven heated to 10–20° C. above the glass transition temperature for 3–4 hours, after which time the film was quenched to room temperature to freeze in the highly ordered monodomain alignment state.

The PCLC film containing the charge control layer was converted into flake form following the procedure described in prior art by Faris in U.S. Pat. No. 5,364,557. The preparation of the flake/host mixture, the cell assembly and the testing are performed in an identical manner to that described in Example 1.

Example 3

To fabricate the device of FIG. 1, (per Example C), 5–7 μm, thermally-cast PCLC films with different selective reflection colors, such as Wacker CLC 535 (green), Wacker CLC-670 (red), and Wacker CLC-450 (blue) are each coated with either different amount or a different number of layers of charge control agent selected from Table 1 dissolved in a solvent solution of the PCLC polymer of the corresponding selective reflection color according to the process outlined in Example 2. Such flakes are suspended in a dielectric fluid host selected from Table 2 and placed in a test cell for evaluation as described in Example 1. An alternative method of achieving the same result is to use a different charge control agent from Table 1 for each flake color group to impart a different magnitude or sign of the charge contained in the charge control layer of each flake color group.

Example 4

PCLC flakes with a large value of dielectric anisotropy may be prepared from parent PCLC materials with little or no inherent dielectric anisotropy by mixing 0.55 g of CB-15 (E. Merck), a low molar mass chiral compound with positive dielectric anisotropy with 2.20 g of Wacker CLC535 polysiloxane LC polymer dissolved in 8.0 g of toluene. The mixture is stirred and a film of the modified PCLC material is cast and processed according to the procedure outlined in Example 2. Flakes of the modified PLC material can be obtained from the modified parent film following the procedure described by Faris in U.S. Pat. No. 5,364,557. The procedures and processes for preparation of the flake/host mixture, cell assembly and testing are performed as described in Example 1.

Example 5

To produce PLC flakes with different colors and correspondingly different values of dielectric anisotropy, the procedure as described above in Example 4 is utilized with the exception that multiple PCLC parent polymer films with different selective reflection wavelengths are doped with different amounts of an additive, CB-15, to determine the dielectric anisotropy of the modified PCLC film and the resultant flakes for each desired color. Flakes of the modified PLC material can be obtained from the modified parent film following the procedure described by Faris in U.S. Pat. No. 5,364,557. The procedures and processes for preparation of the flake/host mixture, cell assembly and testing are performed as described in Example I.

Example 6

Fabrication of the device shown in FIG. 3 is accomplished by first suspending 50 mg (3–6 wt %) of Wacker CLC535 polysiloxane LC flakes of the dimensions described in Example 1 into 1 g of a E7 nematic liquid crystal mixture (E. Merck). Substrates bearing a transparent conductive coating as described in Example 1 are coated with a 500 A layer of Nylon 6/6 spin-deposited from a 2% formic acid solution. After baking the substrates at 120° C. for 15 minutes, the polyimide coatings were buffed using a velvet roller to produce a uniform and homogeneous alignment state. The PLC flake/nematic LC suspension was added to the cell as described in Example I and the cell was evaluated by applying a driving waveform consisting of intermittent, 1 KHz sine-wave or square-wave bursts to the device.

Example 7

Devices with the PCLC flakes/host fluid system encapsulated in spherical cavities in a film-forming polymer binder may be prepared by first suspending the desired PCLC flakes or mixture of PCLC flakes into the desired host fluid selected from Table 2 with appropriate charge control agents selected from Table 1. If desired, an oil-soluble isotropic or dichroic dye such as Oil Red O, Sudan III, or Sudan Black B can be added to the flake/fluid host suspension to add additional color switching capabilities as was described previously. A water-based encapsulation medium employing such water-soluble, thermoplastic polymers as polyvinyl alcohol (PVA), polyethylene oxide (PEO), or polyvvinyl pyrroldone (PVP) is prepared by dissolving a suitable amount of the polymer in water to impart sufficient viscosity for the encapsulation. Typically, a solids concentration of around 10–50% of the film-forming polymer in water is used, depending on the particular polymer matrix selected. A surfactant or series of surfactants are added to the encapsulation matrix to stabilize the final emulsion. The PCLC flake/fluid host suspension is added to the encapsulation matrix in a ratio of 60% to 40% respectively, and dispersed using either a high shear mixer or a commercial blender in a manner similar to that described by Fergason in U.S. Pat. Nos. 4,707,080 and 5,523,863 for NCAP dispersions. The resulting emulsion can then be cast onto a rigid or flexible substrate bearing a transparent conductive coating using knife coating techniques known to those skilled in the art. After the film is allowed to air-dry, a second substrate with a conductive coating can be laminated onto the remaining exposed surface of the film to form the desired device.

Example 8

Fabrication of a device with the PCLC flake/host fluid system contained within elliptical cavities in a polymer binder (FIG. 7) is accomplished by preparation of the PCLC flake/fluid host suspension as described in Example 7 and encapsulating it into a water-soluble thermosetting, film-forming polymer emulsion or varnish such as Varathane polyurethane emulsion. The urethane encapsulation medium also contains quantities of additional surfactants as described in Example 7. Microencapsulation, film casting and film processing is conducted as described in Example 7, with the exception that the partially cured film is laminated with stretching and heat according to the procedure described in Fergason, U.S. Pat. No. 5,523,863, to simultaneously produce the elongated capsules and cure the film to maintain the elliptical capsule shape upon cooling.

From the foregoing description, it will be apparent that there has been disclosed a class of electrically switchable electro-optical devices using PLC and BP flakes suspended in fluid hosts, which devices have many applications in optics, photonics and displays. Variations and modifications of the herein described devices, within the scope of the invention will undoubtedly suggest themselves to those skilled in the art. Accordingly, the foregoing description should be taken as illustrative and not in a limiting sense.

What is claimed is:

1. An optical device comprising a system of electro optically sensitive flakes suspended in a fluid host for selectively changing an optical characteristic thereof by changes in an applied electric field, wherein said flakes are polymeric liquid crystal (PLC) or birefringent polymer (BP) material.

2. The device, according to claim 1, wherein said optical characteristic is reflectivity, transmissivity, or polarization, and the flakes and host system has states in which said optical characteristic is changed in each of said states.

3. The device, according to claim 2, wherein the flakes in said system are switchable by said field between said states in which they are represented by rotation of from at least about 3 to at least about 20 degrees thereby providing two states of relative angular disposition.

4. The device, according to claim 1, wherein said flakes are from about 20 to about 40 microns wide, and have a length to width ratio of about 2 to 3, and a thickness of about 5 to 7 microns.

5. The device, according to claim 1, wherein said host fluids are selected from the group consisting of an isotropic dielectric material and a nematic liquid crystal fluid.

6. The device, according to claim 1, wherein said flakes have dielectric anistropy and are changeable in said optical characteristic by an AC field.

7. The device, according to claim 6, wherein said dielectric anisotropy is provided by doping the materials of said flakes during the fabrication thereof with a dielectric anisotropy inducing material.

8. The device, according to claim 6, wherein different groups of said flakes have different values of dielectric anisotropy to provide selective reflection or transmission of different colors corresponding to different values of amplitude or frequency of said AC field.

9. The device, according to claim 1, wherein said host includes a surfactant material.

10. The device, according to claim 1, wherein said host contains a dye.

11. The device, according to claim 1, wherein a plurality of said flake/host systems are embedded in a polymer binder and constitute a plurality of capsules in said binder.

12. The device, according to claim 11, wherein said binder is a flexible polymer.

13. The device, according to claim 11, wherein said host is selected from an isotropic dielectric host liquid and a nematic liquid.

14. The device, according to claim 1, wherein said capsules are of microscopic size.

15. The device, according to claim 1, wherein said flakes are insoluble in the host fluid.

16. The device, according to claim 1, wherein said flakes and host are of generally the same density.

17. The device, according to claim 1, wherein said host fluid has a resistivity equal or greater than $10^9$ ohm-cm.

18. The device, according to claim 1, wherein said host has a viscosity sufficient only to hold said flakes in suspension.

19. The device, according to claim 1, wherein the index of refraction of the flakes and the host fluid are approximately the same.

20. The device, according to claim 1, wherein said flake host systems are contained between cell substrates coated with a transparent conductive coating to which voltage is applied to produce said field.

21. The device, according to claim 1, wherein said host fluid is a gel.

22. The device, according to claim 1, wherein said flakes are patterned by being of selected geometric shapes or by markings on at least one surface thereof.

23. The device, according to claim 2, wherein said states are bistable.

24. The device, according to claim 23, wherein said host material has viscosity which enables said bistable states to be provided.

25. The device, according to claim 24, wherein said host material is a gel.

26. An optical device comprising a system of electro optically sensitive flakes suspended in a fluid host for selectively changing an optical characteristic thereof by changes in an applied electric field, wherein said flakes are selected from the group consisting of PNLC, PCLC, BP, and pitch gradient PCLC.

27. An optical device comprising a system of electro optically sensitive flakes suspended in a fluid host for selectively changing an optical characteristic thereof by changes in an applied electric field, wherein said flakes are polymeric liquid crystal (PLC) or birefringent polymer (BP) material and said system further comprises a charge control agent.

28. An optical device comprising a system of electro optically sensitive flakes suspended in a fluid host for selectively changing an optical characteristic thereof by changes in an applied electric field, wherein said flakes are polymeric liquid crystal (PLC) or birefringent polymer (BP) material and comprises flakes having charge control layers on the surface thereof.

29. The device, according to claim 28, wherein different groups of said flakes have said charge control layers which have different concentrations so as to be addressable selectively by electric fields of different magnitude.

30. The device, according to claim 29, wherein said different groups have polarizations for different colors.

31. An optical device comprising a system of electro optically sensitive flakes suspended in a fluid host for selectively changing an optical characteristic thereof by changes in an applied electric field, wherein a plurality of said flake/host systems are embedded in a polymer binder and constitute a plurality of capsules in said binder, and said flakes are selected from the group consisting of PNLC, PCLC, BP and pitch gradient PCLC, and have a flake size less than said capsules along a longitudinal dimension thereof.

32. The device, according to claim 31, therein said capsules are generally spherical.

33. The device, according to claim 31, wherein said capsules are generally elliptical.

34. The device, according to claim 31, wherein said flakes contain a dielectric anisotrophy inducing agent or dopant.

35. An optical device comprising a system of etectro optically sensitive flakes suspended in a fluid host for selectively changing an optical characteristic thereof by changes in an applied electric field, wherein said flake host systems are contained between cell substrates coated with a transparent conductive coating to which voltage is applied to produce said field, and said flakes are polymer liquid crystal flakes in Grandjean orientation.

36. An optical device comprising a system of electro optically sensitive flakes suspended in a fluid host for selectively changing an optical characteristic thereof by changes in an applied electric field, wherein said flakes are polymeric liquid crystal (PLC) or birefringent polymer (BP) material and said host includes a surfactant material and a charge control agent.

* * * * *